(12) United States Patent
Keinath

(10) Patent No.: US 11,022,254 B2
(45) Date of Patent: Jun. 1, 2021

(54) THERMALLY INDUCED RECIRCULATION MIXING FOR GEL STRENGTH MITIGATION

(71) Applicant: Brendon L. Keinath, Houston, TX (US)

(72) Inventor: Brendon L. Keinath, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 188 days.

(21) Appl. No.: 16/359,118

(22) Filed: Mar. 20, 2019

(65) Prior Publication Data

US 2019/0219229 A1  Jul. 18, 2019

Related U.S. Application Data

(62) Division of application No. 14/830,939, filed on Aug. 20, 2015, now Pat. No. 10,281,087.

(60) Provisional application No. 62/051,634, filed on Sep. 17, 2014.

(51) Int. Cl.
| | | |
|---|---|---|
| H05B 6/10 | (2006.01) | |
| F17D 1/18 | (2006.01) | |
| F16L 11/127 | (2006.01) | |
| E21B 36/04 | (2006.01) | |
| F16L 53/38 | (2018.01) | |

(52) U.S. Cl.
CPC ............... *F17D 1/18* (2013.01); *E21B 36/04* (2013.01); *F16L 53/38* (2018.01); *H05B 6/107* (2013.01); *H05B 6/108* (2013.01)

(58) Field of Classification Search
CPC . F17D 1/18; H05B 6/108; H05B 6/107; F16L 53/38; E21B 36/04
USPC ....... 219/629, 628, 630, 635, 643, 535, 277, 219/278, 646; 392/469, 480, 468, 478, 392/482, 466; 165/70, 164, 184, 185; 138/103, 149
See application file for complete search history.

(56) References Cited

U.S. PATENT DOCUMENTS

| | | | | |
|---|---|---|---|---|
| 2,066,668 A | * | 1/1937 | Bennett .................. | H05B 6/362 219/50 |
| 2,757,739 A | | 8/1956 | Douglas et al. ................ | 166/61 |
| 3,617,699 A | * | 11/1971 | Othmer .................. | F16L 53/34 392/469 |
| 3,908,763 A | | 9/1975 | Chapman ...................... | 166/302 |
| 4,988,427 A | | 1/1991 | Wright .......................... | 204/304 |
| 5,256,844 A | * | 10/1993 | Grosvik ................ | F16L 53/004 138/103 |
| 6,278,095 B1 | | 8/2001 | Bass et al. .................... | 219/629 |
| 2010/0300486 A1 | | 12/2010 | Hoffman et al. ................ | 134/8 |
| 2011/0248019 A1 | | 10/2011 | Chew ............................. | 219/600 |
| 2012/0125906 A1 | | 5/2012 | Geertsen et al. ............. | 219/201 |

(Continued)

FOREIGN PATENT DOCUMENTS

WO    WO2013/092449    6/2013    ............ E21B 36/00

*Primary Examiner* — Quang T Van

(74) *Attorney, Agent, or Firm* — Leandro Arechederra, III

(57) ABSTRACT

Systems, methods, and apparatuses for treating petroleum in a container are disclosed herein. The method includes electrically heating a portion of the container to generate heat sufficient to create convection currents in the petroleum. The method also includes stopping heating after the petroleum cools below a threshold temperature. The systems, methods, and apparatuses mitigate yield stress in petroleum susceptible to gelling.

13 Claims, 6 Drawing Sheets

(56) References Cited

U.S. PATENT DOCUMENTS

2013/0098625 A1    4/2013   Hickman ...................... 166/335
2015/0285409 A1   10/2015   Espinasse et al. ............ 138/149

\* cited by examiner

THERMALLY INDUCED RECIRCULATION MIXING FOR GEL STRENGTH MITIGATION

CROSS REFERENCE TO RELATED APPLICATIONS

This application is a Divisional of U.S. patent application Ser. No. 14/830,939 filed Aug. 20, 2015 and claims the priority benefit of U.S. Patent Application 62/051,634 filed Sep. 17, 2014 entitled THERMALLY INDUCED RECIRCULATION MIXING FOR GEL STRENGTH MITIGATION, the entirety of which is incorporated by reference herein.

FIELD OF THE INVENTION

This disclosure relates to systems and techniques for mitigating yield stress in petroleum. More particularly, this disclosure relates to methods and systems for mitigating yield stress of waxy crudes susceptible to gelling in containers, such as pipelines in petroleum production systems during shut-in scenarios.

BACKGROUND

This section is intended to introduce various aspects of the art, which may be associated with exemplary embodiments of the present techniques. This discussion is believed to assist in providing a framework to facilitate a better understanding of particular aspects of the present techniques. Accordingly, it should be understood that this section should be read in this light, and not necessarily as admissions of prior art.

The extraction and transport of petroleum from a reserve or reservoir often involves movement of petroleum through one or more lengths of pipeline. Petroleum comprises a hydrocarbon fluid mixture that can include, as examples, various concentrations of light hydrocarbons and wax, as well as non-hydrocarbon compounds. The mixture is sometimes referred to as a waxy crude.

Movement of waxy crudes through a pipeline faces a number of challenges. One challenge is that as the temperature of the waxy crude decreases, the associated fluids can exhibit complex rheological properties at lower than the wax appearance temperatures. In these temperatures, wax begins to crystallize and can interlock with itself and other suspended solids. As the temperature decreases further, the fluid approaches the pour point temperature and will form a gel or gel-like substance. That is, the fluid can go from acting as a simple Newtonian fluid to a complex viscoelastic and thixotropic fluid. Once the fluids approach the pour point temperature, the fluids can exhibit large yield stresses and additional viscous components.

While gelling during operation is a concern due to increased apparent viscosities, perhaps a bigger concern is gelling during shut-in scenarios. If the fluid is allowed to gel while stagnant, the pressures needed to overcome the yield stress and restart the pipeline can be substantial. In some cases the required pressure can exceed the maximum allowable pressure of the piping. One consequence is that if the corresponding production facility does not have enough well head pressure, or pumping pressure, to restart a gelled pipeline, the end result may be that no more fluid can be passed through the pipeline.

In conventional petroleum transport, there are two ways to compensate for gelling in pipelines. One way is to add chemicals, sometimes referred to as pour point depressants, to the fluid. These added chemicals interact with the wax structure that is formed and weaken it reducing the strength of the gel. However, these chemicals can lead to significant operational expenditures. A second way to compensate for gelling in pipelines is to heat the pipelines to keep the temperature of the fluid from going below the pour point temperature. However, the amount of heat required can be significant, especially during a shut-down for an indefinite amount of time, resulting in significant operational expenditures, in addition to capital expenditures for high-capacity heating equipment. Thus, there is a need for less-costly alternatives for treating petroleum products, including waxy crude, that might assist with re-starting gelled pipelines, particularly during shut-in scenarios.

SUMMARY

An embodiment provides a method of treating petroleum in a container. The method includes electrically heating a portion of the container to generate heat sufficient to create convection currents in the petroleum. The method also includes stopping heating after the petroleum cools below a threshold temperature.

Another embodiment provides a petroleum production system. The petroleum production system includes a length of pipeline having an inner diameter forming a pipeline lumen configured to carry petroleum from a first location to a second location. The petroleum production system further includes a heating strip located substantially along a bottom portion of the length of pipeline, the heating strip being disposed in sufficient proximity to the pipeline lumen of the length of pipeline to provide heat to petroleum contained within the pipeline lumen. The petroleum production system further includes a power source coupled to the heating strip and configured to supply sufficient power to the heating strip to heat at least a portion of petroleum in the pipeline lumen in a manner that induces convection currents in the petroleum.

Another embodiment provides an apparatus for containing a petroleum with low yield stress. The apparatus includes a length of pipeline having an inner diameter forming a pipeline lumen configured to carry petroleum from a first location to a second location. The apparatus further includes a heating strip coupled to a portion of the length of pipeline, the heating strip being disposed in sufficient proximity to the pipeline lumen of the length of pipeline to provide heating to the portion of the pipeline, wherein a length of the heating strip is over one hundred times a width of the heating strip.

BRIEF DESCRIPTION OF THE DRAWINGS

The advantages of the present techniques are better understood by referring to the following detailed description and the attached drawings, in which.

DETAILED DESCRIPTION OF THE DRAWINGS

In the following detailed description section, specific embodiments of the present systems, devices, and techniques are described. However, to the extent that the following description is specific to a particular embodiment or a particular use of the present systems, devices, and techniques, this is intended to be for exemplary purposes only and simply provides a description of the exemplary embodiments. Accordingly, the systems, devices, and techniques are not limited to the specific embodiments described below, but rather, include all alternatives, modifications, and equivalents falling within the spirit and scope of the appended claims.

At the outset, for ease of reference, certain terms used in this application and their meanings as used in this context are set forth. Further, the present systems, devices, and techniques are not limited by the usage of the terms shown below, as all equivalents, synonyms, new developments, and terms or systems, devices, and techniques that serve the same or a similar purpose are considered to be within the scope of the present claims.

"Gel" may be defined a number of ways and the particular definition intended for a given context set forth herein may be selected from the following, as will be clear to those of skill in the art. One definition indicates that a "gel" is a generally colloidal suspension or a mixture of microscopic water particles (and any hydrophilic additives) approximately uniformly dispersed through the oil (and any hydrophobic additives), such that the fluid or gel has a generally homogeneous gelatinous consistency. Still another definition provides that a "gel" is a colloid in which the disperse phase has combined with the continuous phase to produce a viscous jelly-like product. Generally, a gel has a structure that is continually building. If the yield stress of a fluid increases over time, the fluid has gelled.

As used herein, "pipeline" is defined to mean a conduit or duct operable to contain a fluid flow, and is not limited to a cylindrical cross section conduit.

As used herein, "wax" refers to a low melting organic mixture, or a compound of high molecular weight that is a solid at lower temperatures and a liquid at higher temperatures.

As used herein, "yield stress" refers to the minimum level of shear stress that must be applied to a material for it to flow as a fluid. Yield stress may be determined by any means or method of measurement known in the art (e.g., measuring the residual stress of a fluid after cessation of steady shear flow).

Figure 1:
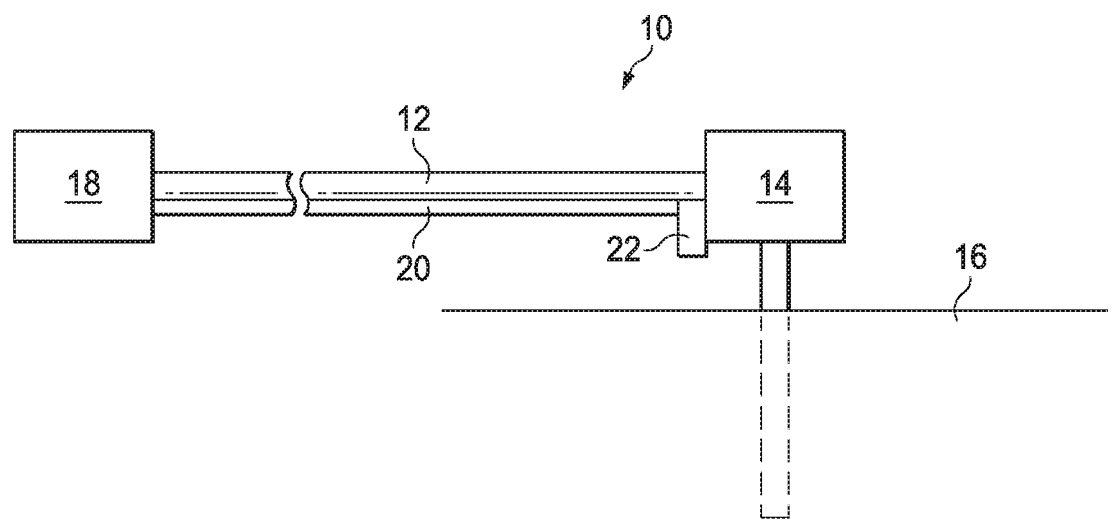
FIG. 1 is a schematic representation of a petroleum production system.

FIG. 1 is a schematic representation of an exemplary petroleum production system 10 in which apparatuses and methods of the present disclosure apply. The petroleum production system 10 comprises a petroleum source 14 configured to pump petroleum out of or allow petroleum to flow out of reservoir 16 into pipeline 12 and ultimately to a desired destination 18, such as a refinery or storage container. In this embodiment, petroleum source 14 is an oil well fitted with various valves, spools, and fittings for providing a route for petroleum from the reservoir 16 to the pipeline 12. One of ordinary skill in the art will recognize that there are a variety of configurations for a petroleum source 14 and the petroleum production system 10 is not limited to any particular configuration. While the petroleum source 14 is in operation, the pipeline 12 transports petroleum to the destination 18.

The petroleum production system 10 further comprises a heating strip 20 running substantially along a bottom portion of the pipeline 12. Heating strip 20 provides heat to a portion of the pipeline 12 near the heating strip. Heating strip 20 may be any suitable source of heat, and in some examples may be for example, a heat exchanger, an inductive heater, or other heating device. When heating strip 20 is an inductive heater, it is coupled to a portion of the pipeline 12 in a manner permitting heat transfer from the heating strip to the pipeline or the contents of the pipeline. As an illustrative example, heating strip 20 may be configured to apply heat to a portion of the contents of the pipeline in manner that introduces a temperature gradient or uneven heat distribution in manner that induces an eddy current within the contents of the pipeline 12. References herein to the inductive heating may additionally or alternatively be referred to as induction heating and/or electromagnetic heating without departing from the scope of the present disclosure. In an embodiment, heating strip 20 comprises an inductor or coil. In an embodiment, the center axis of the coil is parallel to the center axis of the pipeline and disposed along or in the pipeline. In some embodiments, this may include line, ring-shaped, and/or helical configurations of the heating strip, or any combinations thereof. In another embodiment, heating strip 20 is a metallic resistive heater that generates heat via ohmic or resistive heating. Since the length of the pipeline 12 is on the order of miles (e.g., 0.5 miles, 5 miles, or 50 miles) in some embodiments, the length of the heating strip 20 is also on the order of miles. In an embodiment, the length of the heating strip 20 is a percentage (e.g., any percentage from 1% to 99%) of the length of the pipeline 12.

In an embodiment, heating strip 20 is powered by an electric current provided by power source 22. Alternate embodiments may utilize multiple power sources 22 powering multiple heating strips 20. If the heating strip is an inductive heater, the power source 22 is an alternating current (AC) power source, e.g., from a solar panel, from a power grid, etc. A frequency of the AC electric current may be selected to be any frequency suitable for inductively heating the selected portion of the pipeline. Illustrative examples of frequencies according to the present disclosure include, for example, frequencies of 1-100 kilohertz (kHz), although frequencies of less than 1 kHz, as well as frequencies of greater than 100 kHz are also within the scope of the present disclosure. If the heating strip 20 is a resistive heater, the power source 22 can be an AC or direct current (DC) power source.

Figure 2A:
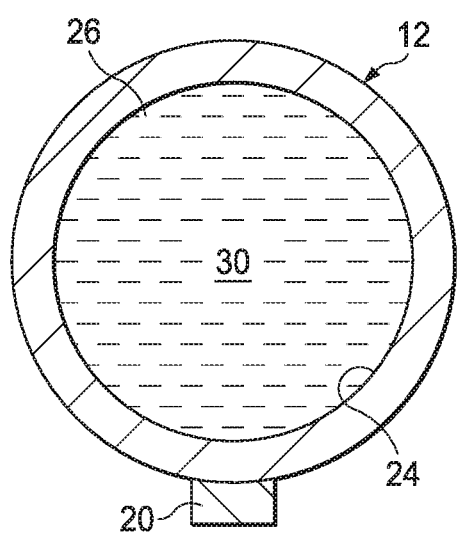
FIGS. 2A-2C are cross-sectional views of an exemplary petroleum pipeline with heating strip illustrating the effects of heating.
Figure 2B:
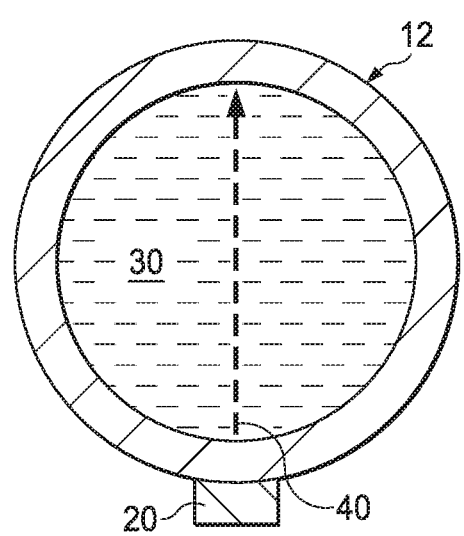
Figure 2C:
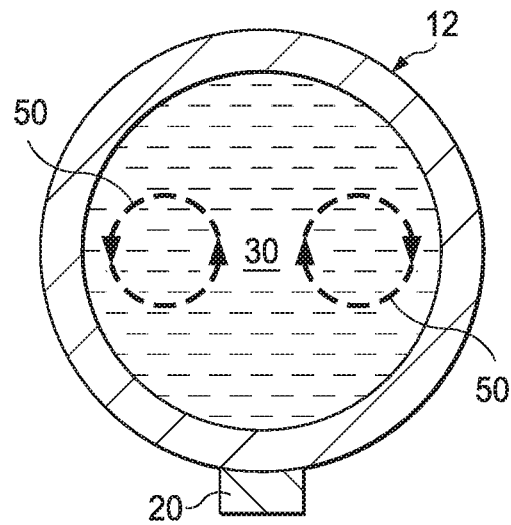

FIGS. 2A-2C are cross-sectional views of an exemplary petroleum pipeline 12 with heating strip 20. In FIGS. 2A-2C, the pipeline 12 is illustrated as containing petroleum 30, such as a waxy crude. The pipeline 12 includes an inner surface 24, which in this embodiment forms an inner diameter of the pipeline 12. The inner surface 24 in this example defines chamber, or in this case a lumen 26, which contains the petroleum 30. FIG. 2B illustrates an effect of applying heat to pipeline 12 using heating strip 20. In one embodiment, heating strip 20 is used to supply heat during shut-in of the pipeline 12. In some embodiments, shut-in refers to a reduction of fluid flow in the pipeline 12, and includes the possibility of no flow of petroleum 30. During shut-in, the petroleum 30 can become stagnant. Heating strip 20 provides heat to a portion of the contents of the pipeline 12, which can result in a temperature gradient represented by the arrow 40, for example, if the heating strip is warmer than the petroleum 30. In some exemplary embodiments, the heating strip is located at a bottom portion of the pipeline 12 to locally heat the fluid 30. Since the heating strip 20 is disposed at the bottom portion of the pipeline, the gradient heat represented by the arrow 40 has a higher temperature at the bottom portion, adjacent the heating strip. The fluid temperature gradually decreases as the distance from the heating strip 20 increases as represented by the arrow 40. FIG. 2C illustrates a result of heating using the heating strip 20. Because of the heat, the density of the petroleum 30 at the bottom portion of the pipeline 12 is lower than the density of the petroleum 30 toward the top portion of the pipeline 12. The resulting instabilities due to the buoyancy forces initiate natural convection or eddy currents 50 in the petroleum 30, as illustrated in FIG. 2C. The convection currents 50 shear the petroleum 30. During cooling periods or shut-in periods, the fluid may begin to gradually gel. The fluid shear caused by the convection currents 50 can result in significantly lower yield stresses in the fluid or the gelled fluid. As becomes more apparent in the description below, the lower yield stresses in the petroleum 30 means flow can be re-initiated with less resistance, allowing for lower restart pressures. This in turn means that equipment can be rated lower, saving costs and energy.

Figure 3A:
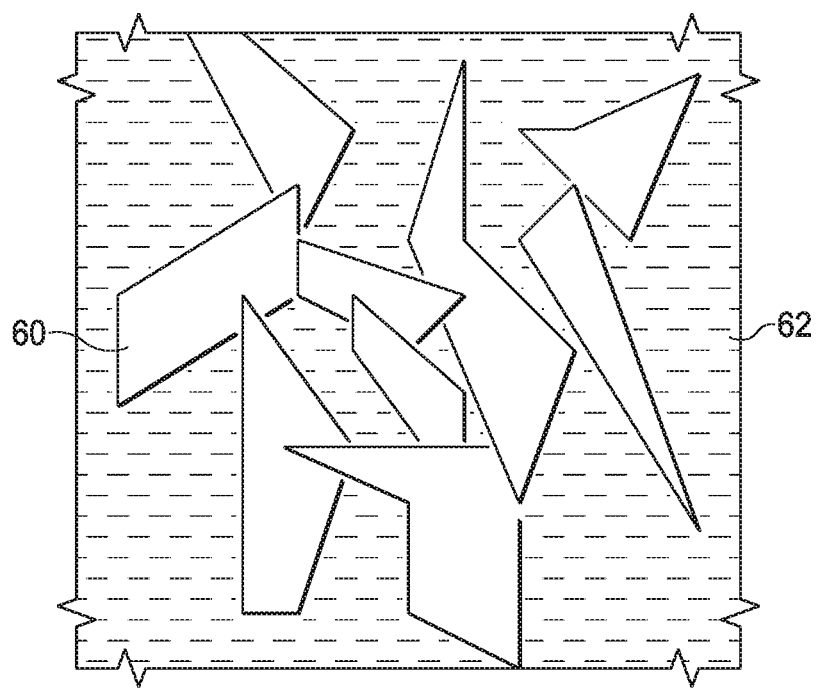
FIGS. 3A and 3B illustrate the effect of shearing on a waxy petroleum at a microscopic level.
Figure 3B:
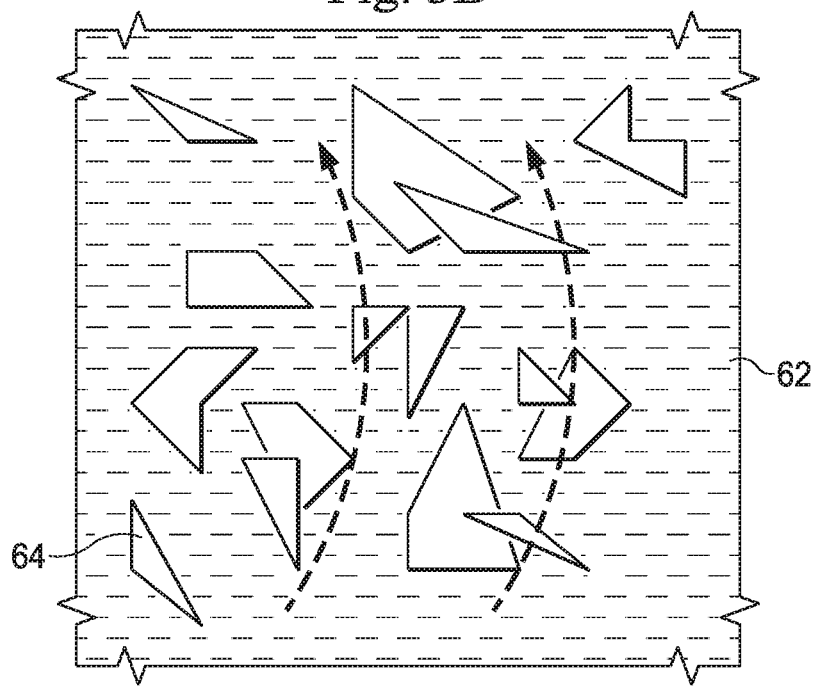

FIGS. 3A and 3B illustrate the effect of shearing on a waxy petroleum at a microscopic level as induced by convection currents created by the heating strip 20. FIG. 3A illustrates the formation of stylized wax crystals 60 in a waxy petroleum 62 as the petroleum cools during shut-in using a conventional system as the wax precipitates and gels. As can be seen, the crystals 60 are relatively large, resulting in overlapping and interference. This directly impacts viscosity and results in a relatively high yield stress requiring high pressure to re-initiate flow. FIG. 3B illustrates the formation of stylized wax crystals 64 in the waxy petroleum 62 as the petroleum cools during shut-in using the heating strip 20. In FIG. 3B, the heating strip along the bottom portion of the pipeline creates the heating gradient that results in eddy currents, represented by the arrows, that increase fluid shear. In FIG. 3B, the shearing from convection currents acts to break-up wax crystals, reducing their particle size, resulting in lower yield stress due to lower crystal interference during crystal propagation. In some embodiments and techniques, the amount of heat that is applied by the heating strip 20 to induce the convection currents is such that the net heat transfer in the pipeline may remain a loss. Heat lost to the ambient, cooler environment along the pipeline perimeter may exceed the heat added by the heating strip 20 and thus the net heat flux with the heating strip 20 applied remains out of the pipeline. In such embodiments, the amount of heat applied by the heating strip 20 may be relatively modest, and the temperature of the petroleum decreases while a heating strip is applied. One consequence of operating in such a manner is that the heating strip 20 increases the levels of shear stress in the waxy petroleum during crystal propagation that occurs while cooling, with the intended effect that yield stress of the petroleum in the shut-in state is reduced.

Figure 4:
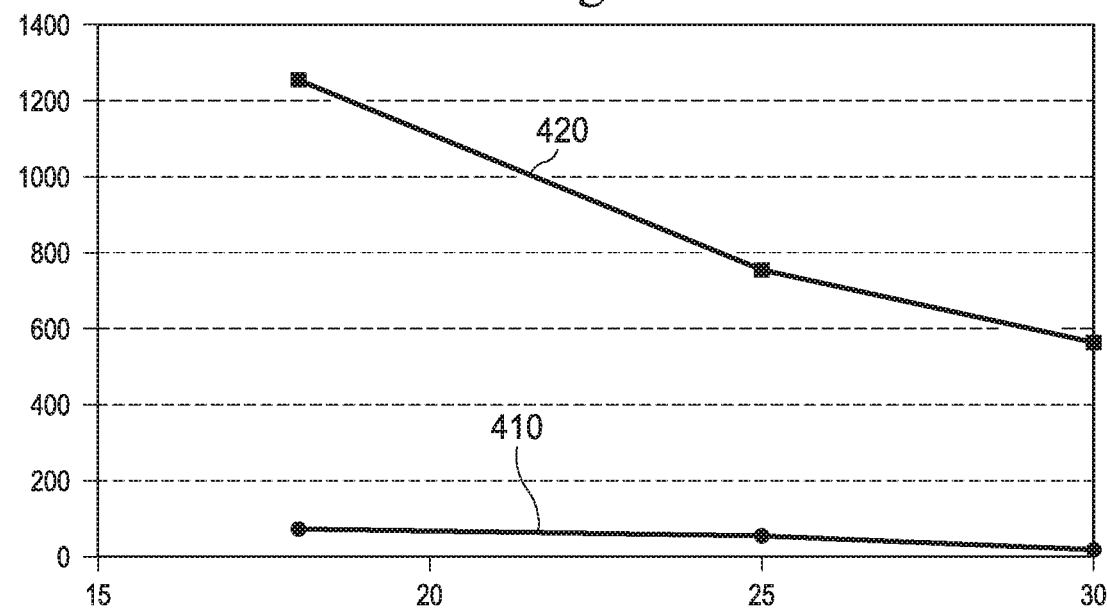
FIG. 4 are lab results illustrating the effects of a shearing process on a waxy crude.

FIG. 4 illustrates an example data set for a waxy crude cooled under ambient or normal conditions, referenced in the chart as curve 420, and a waxy crude cooled under shear conditions (i.e., with application of heating strip 20), referenced in the chart as curve 410. The data set was obtained in laboratory conditions. The x-axis represents temperature in Celsius (C), and the y-axis represents yield stress in Pascals (Pa). As is apparent in FIG. 4, applying a heating strip to shear the petroleum during cooling can result in significantly lower yield stresses than if the petroleum is allowed to cool under ambient conditions. A benefit of this phenomenon is recognized by relating yield stress to pressure differential needed across a gelled pipeline. The pressure differential ΔP needed across a pipeline is substantially proportional to yield stress. The pressure differential can be estimated as $$\Delta P = \frac{1}{4} \tau_{ys} \frac{L}{D}, \quad (1)$$

where ΔP is the pressure differential, $\tau_{ys}$ is the yield stress of the fluid, L is the pipeline length, and D is the pipeline diameter. This analysis assumes a substantially cylindrical pipeline. If the petroleum source 14 (FIG. 1) does not have enough well head pressure or pumping pressure to overcome the pressure differential, the pipeline may become overly sluggish or completely clogged, thereby limiting the amount or even completely preventing the flow of fluid through the pipeline. Since the pressure needed to re-start flow is proportional to the yield stress, any reduction in yield stress will allow for a lower required pressure differential, which increases the ability to re-start flow in a pipeline by reducing the amount of required pressure. A process of cooling a shut-in pipeline using a heating element to induct convective current can result in substantially lower pressure differentials. Another way to consider the data in FIG. 4 is that, for a given yield stress, lower temperatures can be accommodated in a pipeline system if shearing is performed during cooling.

Although the embodiments thus far have been directed to pipelines that carry petroleum, the shearing effects illustrated in FIGS. 3A, 3B, and 4 can be used to reduce yield stress in any container that stores petroleum, such as a stationary storage tank, a railway tanker, barge, or other container. For example, one or more heating strips can be applied to such storage containers to induce convection currents and shearing so as to reduce yield stress as petroleum in the storage containers cools.

Figure 5A:
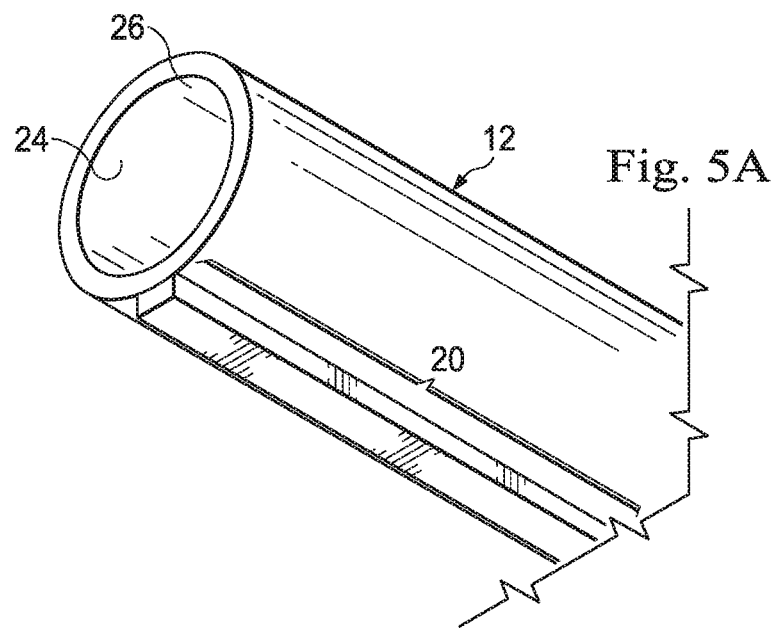
FIGS. 5A through 5C are perspective views of exemplary embodiments of a heating strip and petroleum pipeline.
Figure 5B:
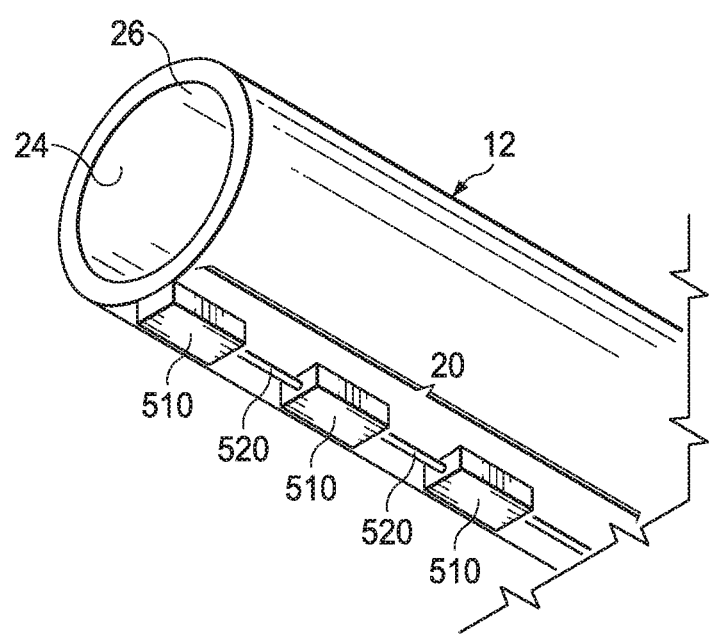
Figure 5C:
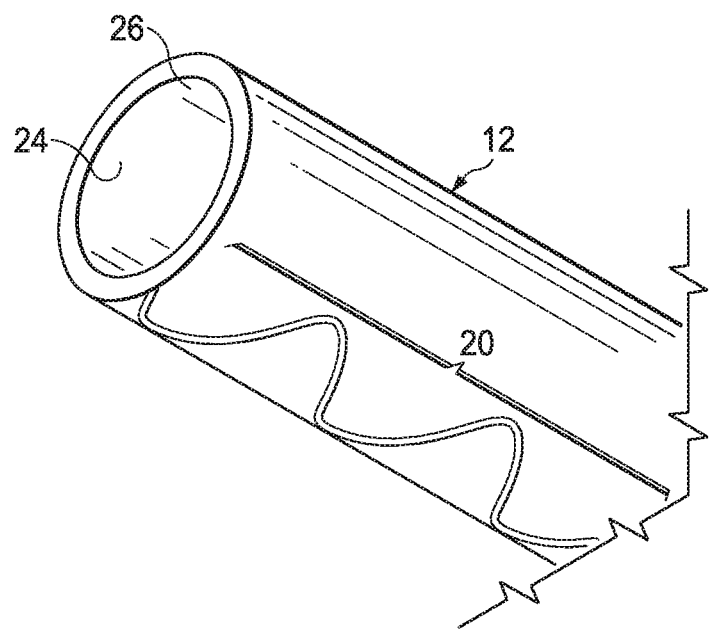

FIGS. 5A, 5B, and 5C are perspective views of exemplary embodiments of a heating strip 20 and petroleum pipeline 12. FIG. 5A shows a heating strip 20 as a straight continuous strip that runs along the bottom portion of a length of the pipeline 12. In one embodiment, the length of the heating strip 20 runs substantially parallel to the longitudinal axis of the pipeline 12 and is disposed substantially directly below the central longitudinal axis of the pipeline. FIG. 5B illustrates a second embodiment of a heating strip 20 along the bottom of portion of the pipeline 12 that, in contrast to the heating strip 20 in FIG. 5A, has intermittent heating elements 510 connected by electric wires 520. FIG. 5C illustrates a third embodiment of a heating strip 20 that is a continuous strip but in a serpentine shape along the bottom portion of pipeline 12. That is, the heating strip 20 in FIG. 5C weaves back and forth along the bottom of the pipeline 12. In the embodiments of FIGS. 5A and 5C, the heating strip 20 can either be attached to the pipeline 12 or detached but placed in close enough proximity to inductively heat the pipeline. Likewise, in the embodiment of FIG. 5B, the elements 510 of heating strip 20 can either be attached to the pipeline 12 or detached but placed in close enough proximity to inductively heat the pipeline. In some embodiments, the heating strip 20 is formed within the wall structure of the pipeline, while in yet other embodiments, the heating strip is disposed within the cavity or lumen of the pipeline. In the embodiments in FIGS. 5A, 5B, and 5C, the heating strip 20 is connected to an electric power source (not shown).

An advantage of placing heating elements 510 intermittently may be that the induced convection current in the petroleum has more of a three-dimensional flow field than a continuous heating strip, such as the heating strip 20 in FIG. 5A. On the other hand, a continuous heating strip may be easier to manufacture than a heating strip comprising intermittent spot heaters. In some embodiments, the intermittent heating elements 510 are inductive heating elements, which can be wire coils or any other type of inductive heater.

Factors in the design of a heating strip are the dimensions and power consumption of the heating strip needed to induce convection currents in a pipeline. To determine the size of the heater strip needed to induce internal natural convection currents, the necessary threshold temperature difference can be determined using the critical Rayleigh number. Although the critical Rayleigh number varies from geometry to geometry, a simple calculation to demonstrate the scale is displayed below assuming the general accepted critical value of 1708.

The Rayleigh number relates various quantities according to the following:

$$\frac{g\beta}{\alpha v}(T_b - T_u)L^3 = 1708, \tag{2}$$

where g is the acceleration due to gravity, $\beta$ is the thermal expansion coefficient for the fluid, $\alpha$ is the thermal diffusivity, $v$ is the kinematic viscosity, $T_b$ is the temperature of a bottom plate, $T_u$ is the temperature of a top plate, and L is the pipeline diameter. In the formulation of the Rayleigh number, it is assumed that there are top and bottom plates surrounding a fluid creating a temperature gradient of $T_b$-$T_u$. In sizing a heating strip, it is assumed that the heating strip provides the temperature $T_b$ and the ambient temperature surrounding the pipeline provides the temperature $T_u$.

Thermal diffusivity a is related to thermal conductivity k, density of the fluid p, and specific heat capacity $c_p$ as $$\alpha = \frac{k}{\rho c_p}. \tag{3}$$

Kinematic viscosity $v$ is related to dynamic viscosity $\mu$ and density of the fluid p as $$v = \frac{\mu}{\rho}. \tag{4}$$

The following values were assumed for a viscous oil suitably employed with a disclosed embodiment. The following units are used herein: meters (m), inches (in), joules (J), kilograms (kg), kelvins (K), seconds (s), and watts (W). A high viscosity (1,000 Pa-s) was assumed since this approach would apply to waxy crude oils at low temperatures.

TABLE 1

Parameters for an exemplary waxy crude.

| Parameter | Value |
| --- | --- |
| Pipeline diameter | 12 in (0.3048 m) |
| Heater width | 2 in (0.0508 m) |
| $c_p$ | 2000 J/kg-K |
| k | 0.16 W/m-K |
| $\mu$ | 1000 Pa-s |
| $\rho$ | 900 kg/m$^3$ |
| $v$ | 1.111111111 Pa-s*m$^3$/kg |
| $\beta$ | 3.17e−4 (1/K) |
| g | 9.81 m/s$^2$ |
| $\alpha$ | 8.8889e−8 |

Solving for the temperature difference needed, one can evaluate the amount of power per unit area q" needed for a heater assuming a simple thermal resistance network.

$$q'' = \frac{k}{L}(T_b - T_u) \tag{5}$$

Substituting for $(T_b-T_u)$ using equation (3) yields $$q'' = \frac{k}{L^4} \cdot 1708 \cdot \frac{\alpha v}{g\beta} \tag{6}$$

Solving for q", a heater input of about 1 W/m$^2$ is needed to maintain internal circulation for the exemplary case presented here assuming that all the heat goes into local heating. The actual result may be greater given that there will most likely be losses to the environment. For a heating strip of 2 inches in width, a power per meter of about 0.05 W/m, or about 80 W/mile is needed for a pipeline to induce convection currents and corresponding shearing of wax crystal structures as the petroleum cools. This is a modest power requirement when compared to a system that would provide full pipeline heating, especially relative to the improvement in yield stress. A typical pipeline is between 8 inches and 12 inches in diameter and can be one the order of miles (e.g., 0.5 miles, 5 miles, or 50 miles) as discussed earlier. In some embodiments, a width of a heating strip is much less than the diameter of the pipeline, and a length of the heating strip is much greater than 100 times the width. For example, for a one mile pipeline with a one mile heating strip, the length of the heating strip is well over 30,000 times the width. In some embodiments, the length of the heating element is greater than 50 times the pipeline width.

Figure 6:
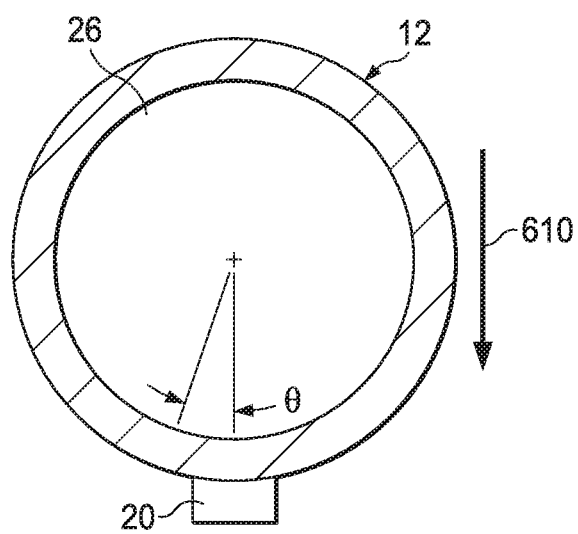
FIG. 6 is a cross-sectional view of an exemplary petroleum pipeline with heating strip illustrating placement of heating strip.

FIG. 6 is a cross-sectional view of an exemplary petroleum pipeline 12 with heating strip 20 illustrating placement of heating strip 20. For reference, the direction of force of gravity is illustrated by arrow 610. The angle $\theta$ represents the offset of a center of heating strip 20 relative to the direction of force of gravity. In this embodiment, the heating strip 20 is offset zero (0) degrees from the direction of gravity. Thus, the heating strip 20 is disposed substantially at the bottom of pipeline 12, which is generally a suitable placement for the inducement of convection currents in petroleum within lumen 26. Since convection currents occur as a result of heating from below, placement of heating strip 20 underneath or below the pipeline 12 is an example of a desired placement. In some examples, the heating strip is disposed at a position substantially within a range of plus or minus 45 degrees from the direction of the gravitational field. In other examples, the heating strip is disposed at a position substantially within a range of plus or minus 30 degrees, and in other embodiments, plus or minus 20 degrees. In general, the heating strip 20 can be disposed at any angle θ.

Figure 7:
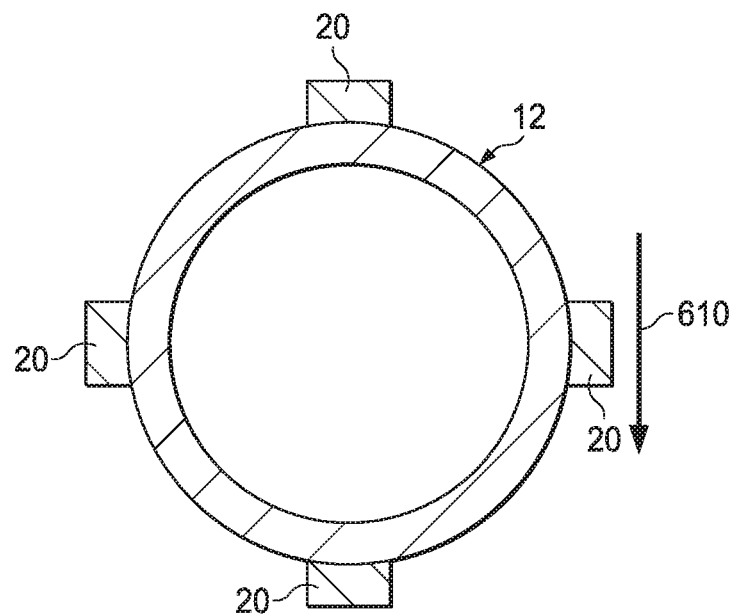
FIG. 7 is a cross-sectional view of an exemplary petroleum pipeline with a plurality of heating strips.

FIG. 7 is a cross-sectional view of an exemplary petroleum pipeline 12 with a plurality of heating strips 20. For reference, the direction of force of gravity is illustrated by arrow 610. In an embodiment, only one of the four heating strips 20 is activated at any one time. In an embodiment, the heating strip 20 that is activated is closest to a bottom portion of the pipeline 12. A plurality of heating strips 20 is placed around the circumference of the pipeline so that regardless of how the pipeline 12 is installed, one of the heaters will be within 45 degrees from the direction of the gravitational field near a bottom portion of the pipeline 12.

Figure 8:
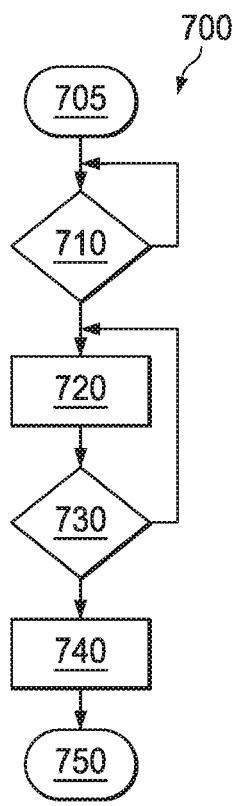
FIG. 8 is a flowchart of an embodiment of a method for shearing petroleum in a pipeline while cooling.

FIG. 8 is a flowchart setting forth an exemplary method 700 for shearing petroleum in a pipeline as it cools in order to reduce yield stress in a gelling petroleum. The method 700 may be implemented in conjunction with the petroleum production system 10 described previously. The method may also be implemented in a pipeline or in any system or container that stores petroleum. For example, the method may also be applied to storage tanks or barges that carry petroleum using one or more heating strips with the containers. The method 700 generally includes a plurality of blocks or steps (e.g., 710 through 740) that may be performed in a serial manner, and one or more steps may be omitted to satisfy the design criteria of a particular application.

The method 700 begins in block 705. In decision block 710, a determination is made whether a container is in a shut-in scenario (e.g., whether a container, such as a pipeline, is in a scenario which causes the petroleum in the pipeline to become stagnant. If the container is in a shut-in scenario, the method 700 advances to block 720, in which a heating strip attached to the container is activated while the petroleum in the pipeline cools. As one of ordinary skill in the art will recognize, there may be other intermediate steps involved in moving from decision block 710 to block 720. In some methods, for example, an operator or an automatic controller may assess the petroleum to determine whether the wax content is high enough in the pipeline to warrant activating the heating strip. Pour point temperature (PPT) is directly related to wax content such that petroleum with high wax content has a high PPT and the PPT decreases as the wax content decreases. If the wax content of the petroleum is such that the range of expected ambient temperatures is above the PPT there may be no need to turn on the heating strip. The heating strip should be turned on before the petroleum reaches its PPT so that convection currents can form to shear the fluid. In some methods, the heating strip is turned on before the temperature of the petroleum reaches the wax appearance temperature. Some methods include activating the heating strip when the temperature is within a temperature range (or tolerance) containing the wax appearance temperature. The temperature may be stored within a controller that controls the heating strip and the heating strip may be automatically activated when the controller receives information that the petroleum temperature is within the temperature range.

A determination of whether to install a heating strip can be made prior to laying pipeline, and may be made based on a number of factors. These include, for example, the expected range of wax content to be carried by the pipeline and the expected range of ambient temperatures of the pipeline, among other factors. For example, from the expected range of wax contents a range of PPTs can be determined. If the lower end of the range of PPTs is within the expected range of ambient temperatures it would be beneficial to install a pipeline that has an associated heating strip. The heating strip could be sized according to the heat sufficient to induce convective currents based on the wax content as described previously.

While the heating strip is active, the application of spot heating along the bottom of a pipeline generates internal convection currents as described previously. The shearing effect of the convection current serves to break up wax crystals or keep large wax crystals from forming such that the yield stress of the petroleum once it gels is significantly lower than if the heating strip had not been applied.

At decision block 730, the petroleum in the pipeline is allowed to cool while the heating strip is turned on. Heat is lost to the ambient environment along the pipeline perimeter with the net heat flux being out of the piping. Accordingly, the temperature of the petroleum decreases even while a heating strip generates heat. In some aspects, a controller or sensor monitors temperature of the petroleum so that once the petroleum is cooled to a threshold or target temperature, the heating strip is deactivated or turned off in block 740. Alternatively, the heating strip can be turned off after some fixed period of time. Any temperature measurements can be made readily available by either measuring the petroleum (or the pipeline itself as a proxy for the petroleum temperature) manually at one or more points along the pipeline or using temperature sensors placed at one or more points along the pipeline. In one embodiment, the temperature sensors communicate temperature readings wirelessly to a central location. In an embodiment, if multiple temperature readings are taken, the temperature readings are averaged to determine an average temperature for use in the method 700. At decision block 730, if the petroleum is not cooled below a target temperature, blocks 720 and 730 are repeated. In decision block 710, if the pipeline is not shut-in, block 710 is repeated so that the pipeline is monitored until it is shut-in. The method 700 ends in block 750.

With the heating strip turned off, the petroleum may continue to gel as it reaches the ambient temperature. Accordingly, although the petroleum may be stored or maintained at an ambient temperature, the pressures required to re-start flow or to move or remove the petroleum from the container are significantly lower than can be otherwise achieved. In addition, because of this, there is a reduced need to maintain a constant or continuous heating in a closed or shut-in container and a reduced need to re-heat the petroleum to enable it to flow. This results not only in reduced energy costs, but also results in less expensive equipment or capital outlays because the need for excessive over-engineering is decreased.

While the present techniques may be susceptible to various modifications and alternative forms, the embodiments discussed above have been shown only by way of example. However, it should again be understood that the techniques is not intended to be limited to the particular embodiments disclosed herein. Indeed, the present techniques include all alternatives, modifications, and equivalents falling within the true spirit and scope of the appended claims.

The invention claimed is:

1. A petroleum production system, including:
   a length of pipeline having an inner diameter forming a pipeline lumen configured to carry petroleum from a first location to a second location;
   a heating strip located only along a section of plus or minus 20° of the bottom portion of the length of pipeline, the heating strip being disposed in sufficient proximity to the pipeline lumen of the length of pipeline to provide heat to petroleum contained within the pipeline lumen; and a power source coupled to the heating strip and configured to supply sufficient power to the heating strip to heat at least a portion of petroleum in the pipeline lumen in a manner that induces convection currents in the petroleum.

2. The system of claim 1, wherein the heating strip includes a plurality of spot heaters connected in series.

3. The system of claim 1, wherein the heating strip is a continuous strip arranged to provide heating uninterrupted along a length of the heating strip.

4. The system of claim 1, wherein the heating strip is configured to provide resistive heating to the pipeline.

5. The system of claim 1, wherein the heating strip is configured to provide inductive heating of the pipeline.

6. The system of claim 1, wherein the heating strip comprises a length and a width, the length of the heating strip being more than 100 times greater than the width.

7. The system of claim 1, wherein the induced convection currents reduce yield stress of the petroleum as the petroleum temperature decreases.

8. The system of claim 1, further comprising:
a quantity of the petroleum located within the pipeline lumen;
a temperature measuring device capable of measuring a temperature of the petroleum; and
a controller that controls the power source coupled to the heating strip;
wherein the controller is configured to activate the power source connected to the heating strip when the temperature of the petroleum falls to the pour point temperature of the petroleum.

9. An apparatus for containing a petroleum with low yield stress, including:
a length of pipeline having an inner diameter forming a pipeline lumen configured to carry petroleum from a first location to a second location; and
a heating strip coupled to a portion of the length of pipeline, the heating strip being disposed in sufficient proximity to the pipeline lumen of the length of pipeline to provide heating to the portion of the pipeline, the heating strip being disposed only along a section of plus or minus 20° of the bottom portion of the length of pipeline, wherein a length of the heating strip is over one hundred times a width of the heating strip.

10. The apparatus of claim 9, wherein the heating strip is located in sufficient proximity to the length of pipeline to heat any petroleum contained in the pipeline to induce convection currents in the petroleum.

11. The apparatus of claim 9, wherein the heating strip is configured to apply heating to a length of the pipeline such that more heat is lost from the petroleum due to ambient conditions external to the pipeline than is added to the petroleum by the heating strip.

12. The apparatus of claim 9, wherein the heating strip comprises a plurality of spot heaters connected in series.

13. The apparatus of claim 9, further comprising: a quantity
of the petroleum located within the pipeline lumen;
a temperature measuring device capable of measuring a temperature of the petroleum; and
a controller that controls a power source coupled to the heating strip;
wherein the controller is configured to activate the power source connected to the heating strip when the temperature of the petroleum falls to the pour point temperature of the petroleum.

* * * * *